US012414587B2

(12) United States Patent
Chen

(10) Patent No.: US 12,414,587 B2
(45) Date of Patent: Sep. 16, 2025

(54) HEATING ATOMIZATION CORE AND ASSEMBLY HAVING MULTI-CORE POROUS LIQUID-CONDUCTING MATERIAL

(71) Applicant: SHENZHEN HUACHENGDA PRECISION INDUSTRY CO. LTD., Shenzhen (CN)

(72) Inventor: Ping Chen, Shenzhen (CN)

(73) Assignee: SHENZHEN HUACHENGDA PRECISION INDUSTRY CO. LTD., Shenzhen (CN)

( * ) Notice: Subject to any disclaimer, the term of this patent is extended or adjusted under 35 U.S.C. 154(b) by 281 days.

(21) Appl. No.: 17/768,479

(22) PCT Filed: Aug. 26, 2020

(86) PCT No.: PCT/CN2020/111457
§ 371 (c)(1),
(2) Date: Apr. 13, 2022

(87) PCT Pub. No.: WO2021/073261
PCT Pub. Date: Apr. 22, 2021

(65) Prior Publication Data
US 2024/0292894 A1 Sep. 5, 2024

(30) Foreign Application Priority Data
Oct. 14, 2019 (CN) ......................... 201921722327.4

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/44* (2020.01); *A24F 40/485* (2020.01);
(Continued)

(58) Field of Classification Search
CPC ...... H05B 3/42; H05B 3/16; H05B 2203/037; H05B 2203/003; A24F 40/10; A24F 40/485; A24F 40/46
See application file for complete search history.

(56) References Cited

FOREIGN PATENT DOCUMENTS

CN 105559146 A 5/2016
CN 105996131 A 10/2016
(Continued)

OTHER PUBLICATIONS

International Search Report of PCT Patent Application No. PCT/CN2020/111457 issued on Nov. 27, 2020.
(Continued)

*Primary Examiner* — Thien S Tran
(74) *Attorney, Agent, or Firm* — Andrew C. Cheng

(57) ABSTRACT

A heating atomization core and assembly having a multi-core porous liquid-conducting material, including a porous liquid-conducting material body and an electrical heating track element attached to a bottom surface of the porous liquid-conducting material body. The electrical heating track element has multiple electrical heating regions, and multiple liquid-conducting holes are formed in the porous liquid-conducting material body and match the electrical heating regions in position and number. The heating atomization assembly comprises the heating atomization core. According to the heating atomization core and assembly, a single-core heating region is divided into multiple multi-core heating regions connected in series, so that heating is more uniform, and liquid can be evaporated and atomized more sufficiently; and the liquid-conducting material body is provided with an intermediate through hole, so that the whole heating atomization assembly is simpler in structure and easier to assemble.

7 Claims, 5 Drawing Sheets

(51) Int. Cl.
*A24F 40/44* (2020.01)
*A24F 40/485* (2020.01)
*H05B 3/16* (2006.01)

(52) U.S. Cl.
CPC ......... *H05B 3/16* (2013.01); *H05B 2203/007* (2013.01); *H05B 2203/013* (2013.01); *H05B 2203/021* (2013.01)

(56) References Cited

FOREIGN PATENT DOCUMENTS

| | | | | |
|---|---|---|---|---|
| CN | 205813574 | U | | 12/2016 |
| CN | 206978758 | U | | 2/2018 |
| CN | 108013512 | A | | 5/2018 |
| CN | 108185536 | A | | 6/2018 |
| CN | 109414078 | A | | 3/2019 |
| CN | 109527657 | A | | 3/2019 |
| CN | 109619687 | A | | 4/2019 |
| CN | 109622259 | A | | 4/2019 |
| CN | 109674094 | A | | 4/2019 |
| CN | 109805460 | A | | 5/2019 |
| CN | 209135478 | U | | 7/2019 |
| CN | 209251767 | U | | 8/2019 |
| CN | 209376696 | U | | 9/2019 |
| CN | 110301674 | A | | 10/2019 |
| CN | 110313649 | A | | 10/2019 |
| CN | 209498585 | U | * | 10/2019 |
| CN | 210158016 | U | * | 3/2020 |
| CN | 210184516 | U | * | 3/2020 |
| JP | 2019503667 | A | | 2/2019 |
| WO | 2017093452 | A | | 6/2017 |

OTHER PUBLICATIONS

The extended European search report of EP patent application No. 20875738.5 issued on Oct. 16, 2023.

The Evaluation report on patent right of CN utility model application No. 2019217223274.

* cited by examiner

HEATING ATOMIZATION CORE AND ASSEMBLY HAVING MULTI-CORE POROUS LIQUID-CONDUCTING MATERIAL

TECHNICAL FIELD

The disclosure relates to an atomization device for atomizing liquid into steam to be inhaled by users via heating through micro-pores, in particular to a heating atomization core and assembly having a multi-core porous liquid-conducting material.

DESCRIPTION OF RELATED ART

Most existing heating assemblies based on micro-porous electrical heating wires in the field adopt a single-piece heating mode and have a cylindrical or planar heating region. When the heating area is large, the temperature of the middle region of the heating surface is higher than that of the peripheral region of the heating surface due to thermal radiation. So, when the existing heating assemblies are used to atomize liquid, liquid in the peripheral region will not be sufficiently atomized due to non-uniform temperature distribution, or a smell of burning will be generated in the middle region due to an excessively high temperature.

BRIEF SUMMARY OF THE DISCLOSURE

The disclosure provides a novel technical solution to solve the technical problems of the prior art.

The objective of the disclosure is to disclose a heating atomization core and assembly having a multi-core porous liquid-conducting material.

The technical solution of the disclosure is as follows: a heating atomization core having a multi-core porous liquid-conducting material comprises a porous liquid-conducting material body and an electrical heating track element attached to a bottom surface of the porous liquid-conducting material body, wherein the electrical heating track element has multiple electrical heating regions, multiple liquid-conducting holes are formed in the porous liquid-conducting material body and match the electrical heating regions in position and number, and the porous liquid-conducting material body is provided with an intermediate through hole.

Preferably, the electrical heating track element of the heating atomization core having a multi-core porous liquid-conducting material has two electrical heating regions, two liquid-conducting holes are formed in the porous liquid-conducting material body, a track element connecting portion is connected between the electrical heating regions of the electrical heating track element, and a first track element electrode and a second track element electrode are disposed at two ends of the electrical heating track element respectively.

Preferably, the electrical heating track element of the heating atomization core having a multi-core porous liquid-conducting material is formed by an electrically conductive heating plate through stamping, cutting, or etching, or is formed by an electrically conductive metal paste printed on the porous liquid-conducting material body.

Based on the heating atomization core having a multi-core porous liquid-conducting material, the disclosure further provides another technical solution: a heating atomization assembly having a multi-core porous liquid-conducting material comprises the heating atomization core.

Preferably, the heating atomization assembly having a multi-core porous liquid-conducting material further comprises a base and a tank, wherein the heating atomization core is mounted within the tank, the base is disposed at an opening of the tank and limits the heating atomization core in the tank, a first electrode and a second electrode are disposed on the base, contact terminals of the first electrode and the second electrode extend into the tank and are electrically connected to the two ends of the electrical heating track element.

Preferably, the base of the heating atomization assembly having a multi-core porous liquid-conducting material is provided with air inlets which are communicated with a space where the electrical heating track element is located, and an outlet channel is formed in the tank and is communicated with the space where the electrical heating track element is located.

Preferably, the porous liquid-conducting material body of the heating atomization assembly having a multi-core porous liquid-conducting material is provided with an intermediate through hole, the intermediate through hole is formed in the center of the porous liquid-conducting material body and is perpendicular to a heating surface attached with a heating plate, and a lower end of the outlet channel penetrates through the intermediate through hole.

Preferably, the base of the heating atomization assembly having a multi-core porous liquid-conducting material is provided with electrode mounting holes, and the first electrode and the second electrode are mounted in the electrode mounting holes.

Preferably, the heating atomization assembly having a multi-core porous liquid-conducting material further comprises a sealing silicon rubber sleeve disposed around an upper surface and side portions of the porous liquid-conducting material body, an outer wall of the sealing silicon rubber sleeve is connected to and sealed by an inner wall of the tank, and an outer wall of the porous liquid-conducting material body is connected to and sealed by an inner wall of the sealing silicon rubber sleeve.

Preferably, the air inlets in the base of the heating atomization assembly having a multi-core porous liquid-conducting material are n-shaped and are communicated with spaces where the electrodes are located.

The disclosure has the following beneficial effects: according to the heating atomization core having a multi-core porous liquid-conducting material, a single-core heating region is divided into double-core or multiple-core heating regions, so that the influence of thermal radiation on each heating region is reduced; and the decentralized and uniform heating atomization core having a multi-core porous liquid-conducting material is fabricated based on the principle that currents of circuits in series connection are equal, so that the problem of excessively concentrated and non-uniform temperature distribution of a heating surface is effectively solved; and the heating atomization assembly having a multi-core porous liquid-conducting material is simple in structure and easy to assemble and machine, the number of parts to be assembled is small, and the material cost and the labor cost for assembly are greatly reduced.

BRIEF DESCRIPTION OF THE SEVERAL VIEWS OF THE DRAWINGS

The disclosure will be further described below in conjunction with the accompanying drawings and embodiments.

DETAILED DESCRIPTION OF THE DISCLOSURE

The technical solutions of the embodiments of the disclosure will be clearly and completely described below in conjunction with the accompanying drawings of the embodiments. Obviously, the embodiments in the following description are merely illustrative ones, and are not all possible ones of the disclosure. All other embodiments obtained by those ordinarily skilled in the art based on the following ones without creative labor should also fall within the protection scope of the disclosure.

Figure 1:
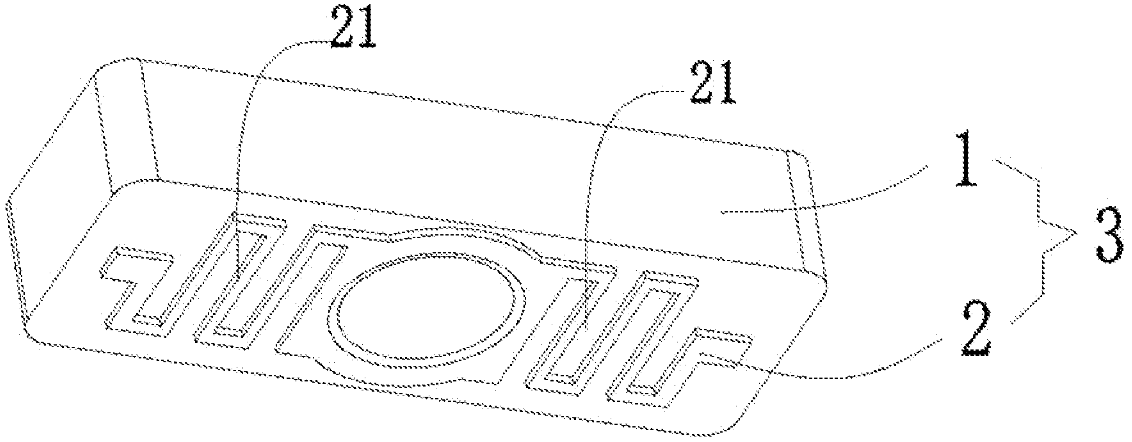
FIG. 1 is a perspective view of a heating atomization core having a multi-core porous liquid-conducting material according to an embodiment of the disclosure.
Figure 2:
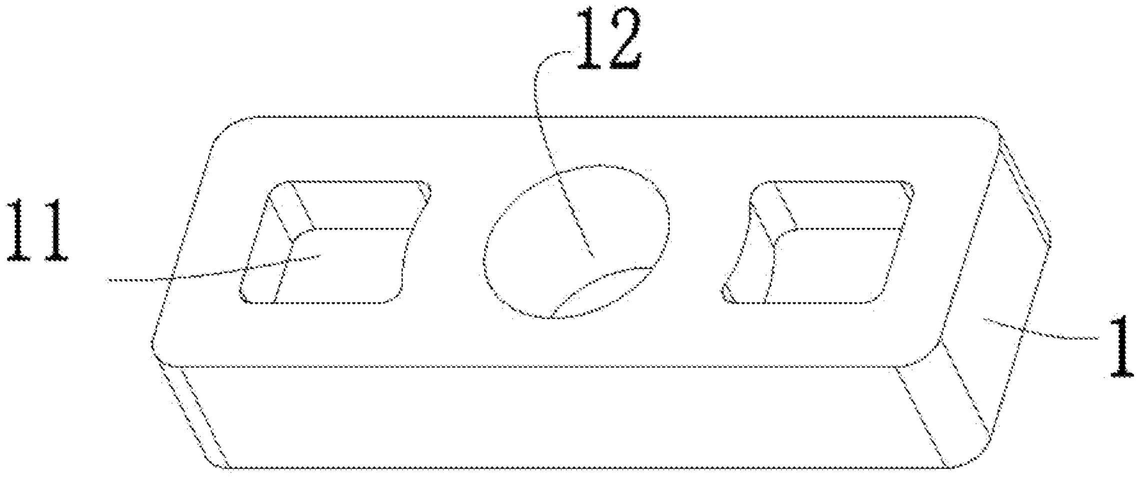
FIG. 2 is a structural diagram of a porous liquid-conducting material body according to an embodiment of the disclosure.
Figure 3:
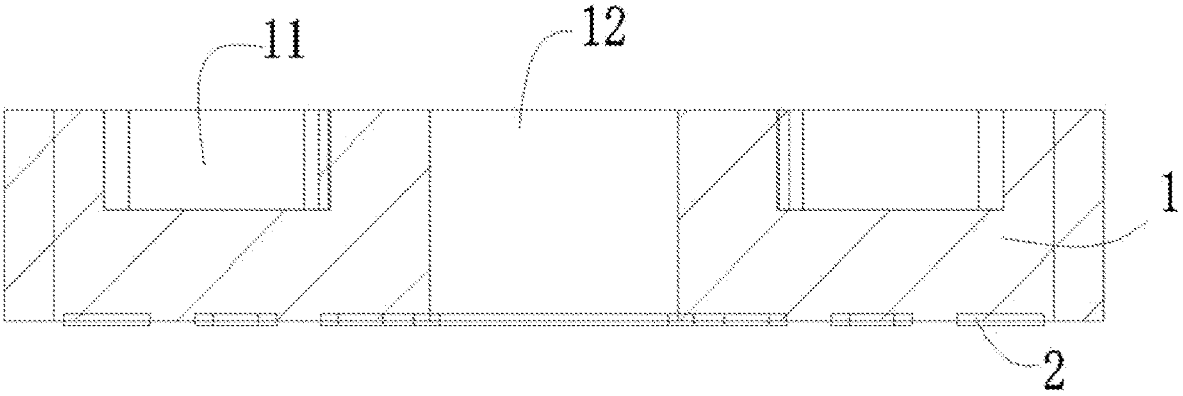
FIG. 3 is a front sectional view of the heating atomization core having a multi-core porous liquid-conducting material according to an embodiment of the disclosure.
Figure 4:
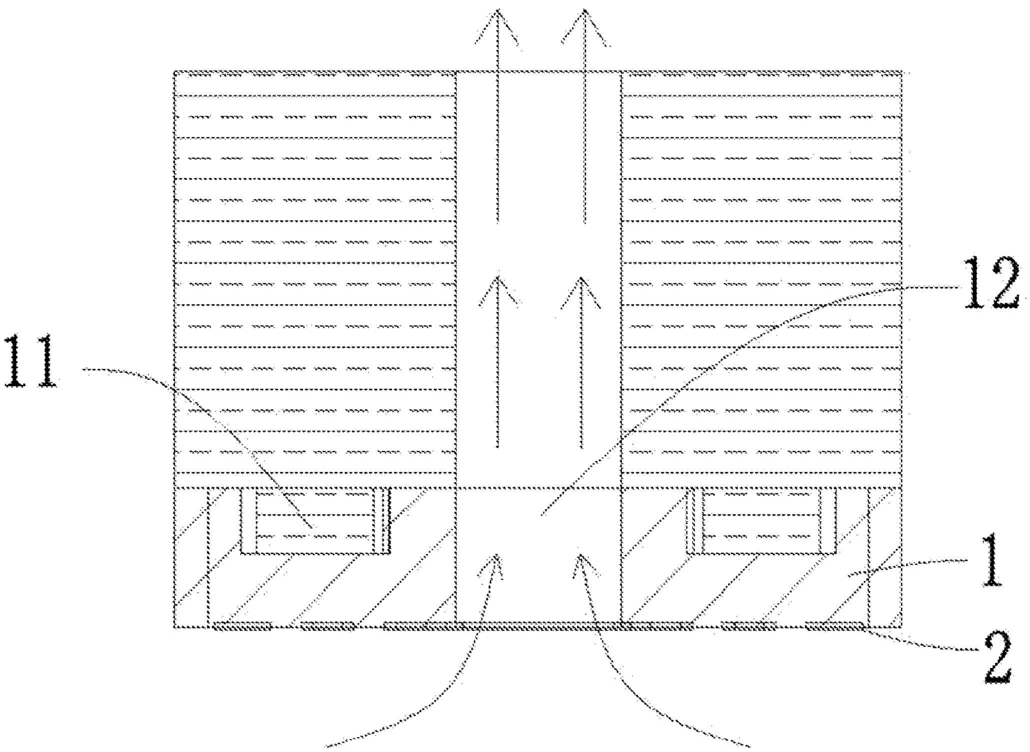
FIG. 4 is a schematic diagram of the flow direction of an air flow of the heating atomization core having a multi-core porous liquid-conducting material according to an embodiment of the disclosure.

Referring to FIG. 1-FIG. 4, the disclosure provides a technical solution: a heating atomization core having a multi-core porous liquid-conducting material comprises a porous liquid-conducting material body 1 and an electrical heating track element 2 attached to a bottom surface of the porous liquid-conducting material body 1. The electrical heating track element 2 has multiple electrical heating regions 21, multiple liquid-conducting holes 11 are formed in the porous liquid-conducting material body 1 and match the electrical heating regions 21 in position and number, and the porous liquid-conducting material body 1 is provided with an intermediate through hole 12. According to the heating atomization core having a multi-core porous liquid-conducting material, a single-core heating region is divided into double-core or multiple-core heating regions, so that the influence of thermal radiation on each heating region is smaller; and the decentralized and uniform heating atomization core having a multi-core porous liquid-conducting material is fabricated based on the principle that currents of circuits connected in series are equal, so that the problem of excessively concentrated and non-uniform temperature distribution of a heating surface is effectively solved. In this embodiment, the electrical heating track element 2 has two electrical heating regions 21, the porous liquid-conducting material body 1 is provided with two liquid-conducting holes 11, a track element connecting portion 32 is connected between the electrical heating regions 21 of the electrical heating track element 2, and a first track element electrode 301 and a second track element electrode 302 are disposed at two ends of the electrical heating track element 2 respectively. The electrical heating track element 2 is formed by an electrically conductive heating plate through stamping, cutting, or etching, or is formed by an electrically conductive metal paste being printed on the porous liquid-conducting material body.

Figure 5:
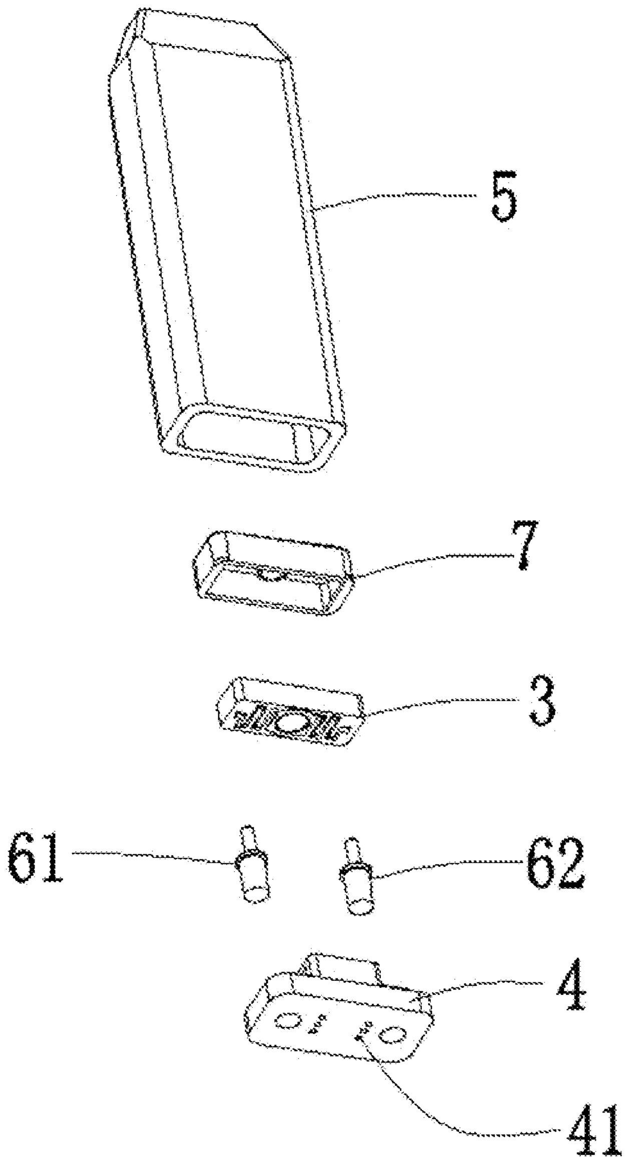
FIG. 5 is an exploded view of a heating atomization assembly having a multi-core porous liquid-conducting material according to an embodiment of the disclosure.
Figure 6:
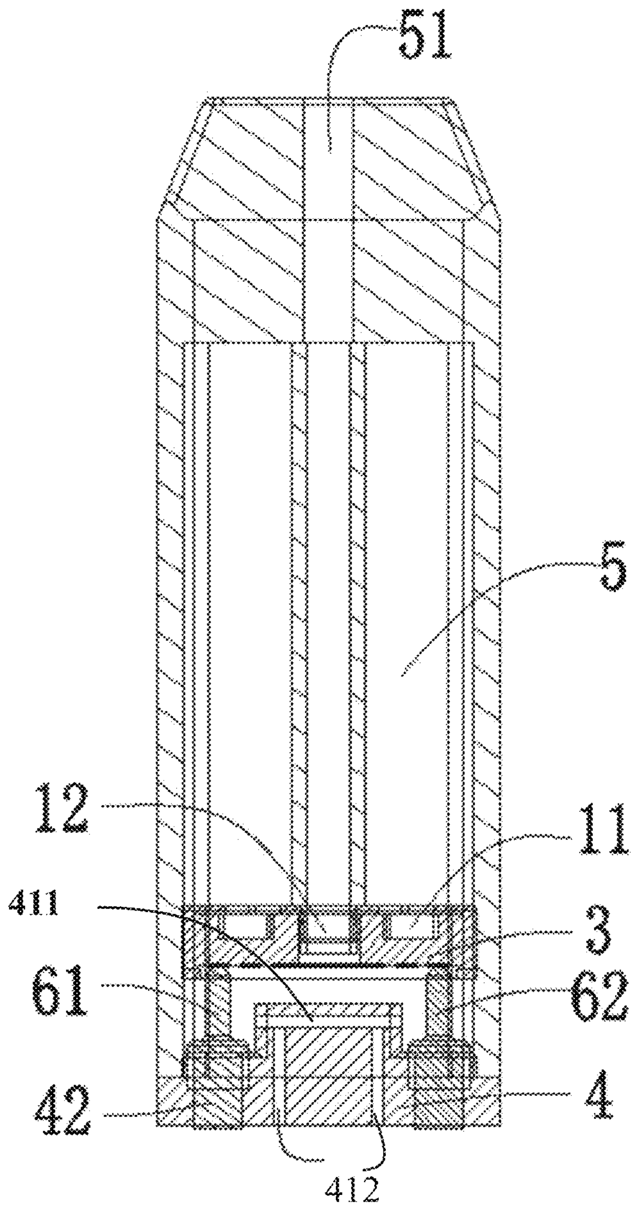
FIG. 6 is a front sectional view of the heating atomization assembly having a multi-core porous liquid-conducting material according to an embodiment of the disclosure.
Figure 7:
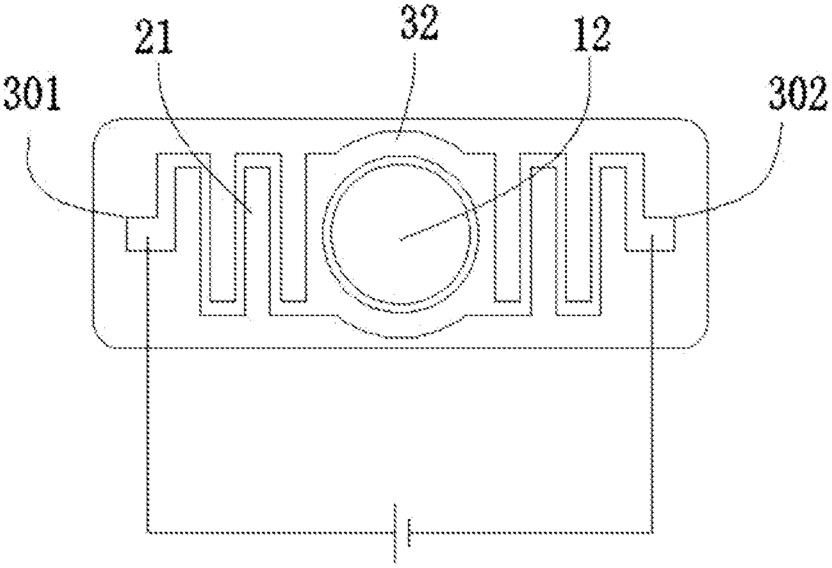
FIG. 7 is a schematic diagram of the power connection of the heating atomization assembly having a multi-core porous liquid-conducting material according to an embodiment of the disclosure.
Figure 8:
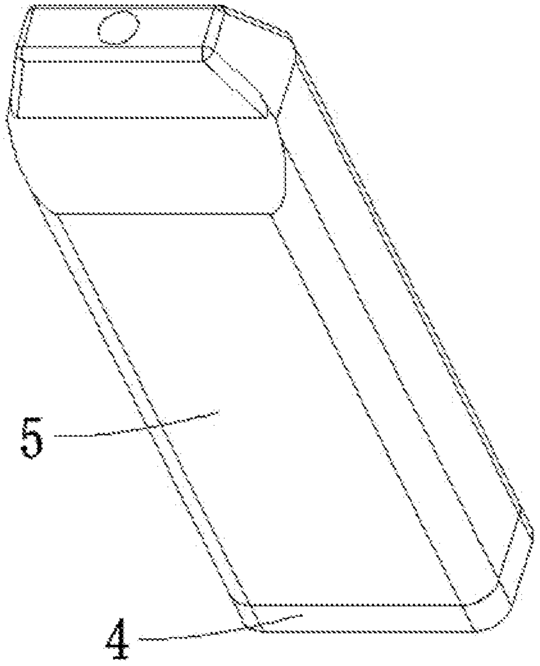
FIG. 8 is an assembled view of the heating atomization assembly having a multi-core porous liquid-conducting material according to an embodiment of the disclosure.

Referring to FIG. 5-FIG. 8, the disclosure further provides another technical solution: a heating atomization assembly having a multi-core porous liquid-conducting material comprises the heating atomization core 3 mentioned above, and further comprises a base 4, a tank 5, a first electrode 61, and a second electrode 62. The first electrode 61, the second electrode 62, and the heating atomization core 3 are mounted within the tank 5, the base 4 is disposed at an opening of the tank 5 and limits the heating atomization core 3 within the tank 5, and contact terminals disposed on the base 4 extend into the tank 5 and are electrically connected to the two ends of the electrical heating track element 2. The base 4 is provided with air inlets 41 which are communicated with a space where the electrical heating track element 2 is located, and an outlet channel 51 is formed in the tank 5 and is communicated with the space where the electrical heating track element 2 is located. The porous liquid-conducting material body 1 is provided with an intermediate through hole 12, the intermediate through hole 12 is formed in the center of the porous liquid-conducting material body 1 and is perpendicular to a heating surface on which a heating plate is attached, and a lower end of the outlet channel 51 penetrates through the intermediate through hole 12. The porous liquid-conducting material body 1 is provided with the intermediate through hole 12, so that the whole heating atomization assembly having a multi-core porous liquid-conducting material is simpler in structure and easier to assemble. The base 4 is provided with electrode mounting holes 42, and the first electrode 61 and the second electrode 62 are mounted in the electrode mounting holes 42. The heating atomization assembly further comprises a sealing silicon rubber sleeve 7 disposed around an upper surface and side portions of the porous liquid-conducting material body 1, an outer wall of the sealing silicon rubber sleeve 7 is connected to and sealed by an inner wall of the tank 35, and an outer wall of the porous liquid-conducting material body 1 is connected to and sealed by an inner wall of the sealing silicon rubber sleeve 7. The air inlets 41 in the base 4 are n-shaped and are communicated with spaces where the electrodes are located. The air inlets 41 in the base 4 each comprise a first segment 411 extending horizontally and two second segments 412 extending vertically from the first segment 411. Opposite ends of the first segment 411 are communicated with the space where the electrical heating track element 2 is located. Each second segment 412 comprises an end in communication with the first segment 411, and an opposite end extending through an end face of the base 4 away from the space where the electrical heating track element 2 located.

In this embodiment, the first track element electrode 301 of the electrical heating track element 2 is electrically connected to the first electrode 61, and the first electrode 61 is connected to a positive electrode of a battery powered power supply; and the second track element electrode 302 of the electrical heating track element 2 is electrically connected to the second electrode 62, and the second electrode 62 is connected to a negative electrode of the battery powered power supply. Liquid in the tank enters a liquid-conducting channel, the porous liquid-conducting material conducts the liquid to a porous material surface inlaid with a heating unit. When power is supplied to the two electrodes of the electrical heating track element, the electrical heating track element is heated instantly to heat and atomize liquid on the porous material surface into steam. When the heating atomization assembly having a multi-core porous liquid-conducting material is powered on to work and a user inhales, an internal transmitter air switch is turned on, air enters the heating atomization assembly via the air inlets 41, and the liquid is atomized to steam on the heating surface and the atomized steam is then inhaled by the users.

According to the heating atomization core and assembly having a multi-core porous liquid-conducting material, a single-core heating region is divided into multiple multi-core heating regions connected in series, so that heating is more uniform, and liquid can be evaporated and atomized more sufficiently; and the heating unit is provided with a through hole, so that the whole heating atomization assembly having the double-core porous liquid-conducting material is simpler in structure and easier to assemble. Multi-region decentralized heating is adopted, so that the heat distribution is more uniform; the whole atomization surface is heated more uniformly, and the heat utilization rate is higher under the same voltage/power output; the heating surface is more uniform, and the smell of burning is avoided, and user experience is good; and the heating atomization assembly having the double-core porous liquid-conducting material is simple in structure and easy to assemble and machine, the number of parts to be assembled is small, and the material cost and the labor cost for assembly are greatly reduced.

Preferred embodiments of the disclosure are specifically described above. However, the disclosure is not limited to the above embodiments, various equivalent transformations or substitutions may be made by any skilled in the art without deviating from the spirit of the disclosure, and all these equivalent transformations or substitutions fall within the scope defined by the claims of the application.

What is claimed is:

1. A heating atomization assembly having a multi-core porous liquid-conducting material, characterized by comprising a heating atomization core (3) comprising a porous liquid-conducting material body (1) and an electrical heating track element (2) attached to a bottom surface of the porous liquid-conducting material body (1), wherein the electrical heating track element (2) has multiple electrical heating regions (21), multiple liquid-conducting holes (11) are formed in the porous liquid-conducting material body (1) and match the electrical heating regions (21) in position and number, and the porous liquid-conducting material body (1) is provided with an intermediate through hole (12);

wherein the heating atomization assembly further comprises a base (4) and a tank (5), wherein the heating atomization core (3) is mounted within the tank (5), the base (4) is disposed at an opening of the tank (5) and limits the heating atomization core (3) in the tank (5), a first electrode (61) and a second electrode (62) are disposed on the base (4), contact terminals of the first electrode (61) and the second electrode (62) extend into the tank (5) and are electrically connected to two ends of the electrical heating track element (2);

wherein the base (4) is provided with air inlets (41) in communication with a space where the electrical heating track element (2) is located, and an outlet channel (51) is formed in the tank (5) and is communicated with the space where the electrical heating track element (2) is located;

wherein the air inlets (41) in the base (4) each comprise a first segment (411) extending horizontally and two second segments (412) extending vertically from the first segment (411), opposite ends of the first segment (411) are communicated with the space where the electrical heating track element (2) is located; and wherein each second segment (412) comprises an end in communication with the first segment (411), and an opposite end extending through an end face of the base (4) away from the space where the electrical heating track element (2) located.

2. The heating atomization assembly having a multi-core porous liquid-conducting material according to claim 1, characterized in that the porous liquid-conducting material body (1) is provided with an intermediate through hole (12), the intermediate through hole (12) is formed in a center of the porous liquid-conducting material body (1) and is perpendicular to a heating surface on which a heating plate is attached, and a lower end of the outlet channel (51) penetrates through the intermediate through hole (12).

3. The heating atomization assembly having a multi-core porous liquid-conducting material according to claim 1, characterized in that the base (4) is provided with electrode mounting holes (42), and the first electrode (61) and the second electrode (62) are mounted in the electrode mounting holes (42); and the electrode mounting holes (42) are parallel to the second segments (412) of the air inlets (41).

4. The heating atomization assembly having a multi-core porous liquid-conducting material according to claim 1, characterized by further comprising a sealing silicon rubber sleeve (7) disposed around an upper surface and side portions of the porous liquid-conducting material body (1), an outer wall of the sealing silicon rubber sleeve (7) is connected to and sealed by an inner wall of the tank (5), and an outer wall of the porous liquid-conducting material body (1) is connected to and sealed by an inner wall of the sealing silicon rubber sleeve (7).

5. The heating atomization assembly having a multi-core porous liquid-conducting material according to claim 1, characterized in that the electrical heating track element (2) has two electrical heating regions (21), two liquid-conducting holes (11) are formed in the porous liquid-conducting material body (1), a track element connecting portion (32) is connected between the two electrical heating regions (21) of the electrical heating track element (2), and a first track element electrode (301) and a second track element electrode (302) are disposed at two ends of the electrical heating track element (2) respectively.

6. The heating atomization assembly having a multi-core porous liquid-conducting material according to claim 1, wherein the electrical heating track element (2) is formed by an electrically conductive heating plate through stamping, cutting, or etching, or is formed by an electrically conductive metal paste printed on the porous liquid-conducting material body.

7. The heating atomization assembly having a multi-core porous liquid-conducting material according to claim 3, wherein the base (4) comprises a middle part in which the air inlets (41) are defined and a shoulder around the middle part, and the electrode mounting holes (42) are defined in the shoulder.

* * * * *